(12) United States Patent
Ragan et al.

(10) Patent No.: US 7,053,337 B2
(45) Date of Patent: May 30, 2006

(54) ROASTER

(75) Inventors: Gary Ragan, Lebanon, NJ (US); John Duncan McNair, Victoria (AU)

(73) Assignee: Salton, Inc., Lake Forest, IL (US)

( * ) Notice: Subject to any disclaimer, the term of this patent is extended or adjusted under 35 U.S.C. 154(b) by 148 days.

(21) Appl. No.: 10/501,042

(22) PCT Filed: Jan. 10, 2003

(86) PCT No.: PCT/US03/00740

§ 371 (c)(1),
(2), (4) Date: Jul. 8, 2004

(87) PCT Pub. No.: WO03/059134

PCT Pub. Date: Jul. 24, 2003

(65) Prior Publication Data

US 2004/0262287 A1 Dec. 30, 2004

Related U.S. Application Data

(60) Provisional application No. 60/347,531, filed on Jan. 11, 2002.

(51) Int. Cl.
*A47J 37/06* (2006.01)

(52) U.S. Cl. ............... 219/386; 219/398; 219/524; 99/372; 99/375; 126/275 R

(58) Field of Classification Search ............... 219/385, 219/386, 395, 398, 404, 429, 432, 433, 435, 219/441, 442, 521, 524; 99/332, 333, 328, 99/427, 372, 375–377; 126/19 R, 275 R
See application file for complete search history.

(56) References Cited

U.S. PATENT DOCUMENTS

| | | | | |
|---|---|---|---|---|
| 3,172,999 A | * | 3/1965 | Sutton et al. | ............... 219/524 |
| 3,393,295 A | | 7/1968 | Jepson et al. | |
| 4,178,500 A | | 12/1979 | Brindopke | |
| 5,380,986 A | * | 1/1995 | Mullen | ............... 219/472 |
| 5,606,905 A | * | 3/1997 | Boehm et al. | ............... 99/375 |
| 5,615,604 A | | 4/1997 | Chenglin | |
| 6,062,130 A | * | 5/2000 | Brady | ............... 99/332 |
| 6,170,389 B1 | | 1/2001 | Brady | |
| 6,369,366 B1 | * | 4/2002 | Mullen | ............... 219/450.1 |
| 6,397,733 B1 | * | 6/2002 | Lin | ............... 99/375 |
| 6,433,312 B1 | | 8/2002 | Chen | |
| 2004/0079353 A1 | * | 4/2004 | Dimitrios | ............... 126/19 R |

* cited by examiner

*Primary Examiner*—Joseph Pelham
(74) *Attorney, Agent, or Firm*—Sonnenschein Nath & Rosenthal LLP

(57) ABSTRACT

A roaster includes an upper pan including an upper side wall and an upper pan heating element inside the upper tub. The roaster further includes a lower pan connected to the upper tub, the lower pan including a lower side wall and a lower pan heating element inside the lower tub. An upper pan fixed temperature regulator and a lower pan fixed temperature regulator may be preset to different selected temperatures. The roaster may also include a grease drain opening through the lower tub. Temperature and timer control logic are provided for the upper pan heating element and the lower pan heating element. In order to set cooking time, the roaster includes a control interface that includes, in one embodiment, a time increment button and a time decrement button.

12 Claims, 23 Drawing Sheets

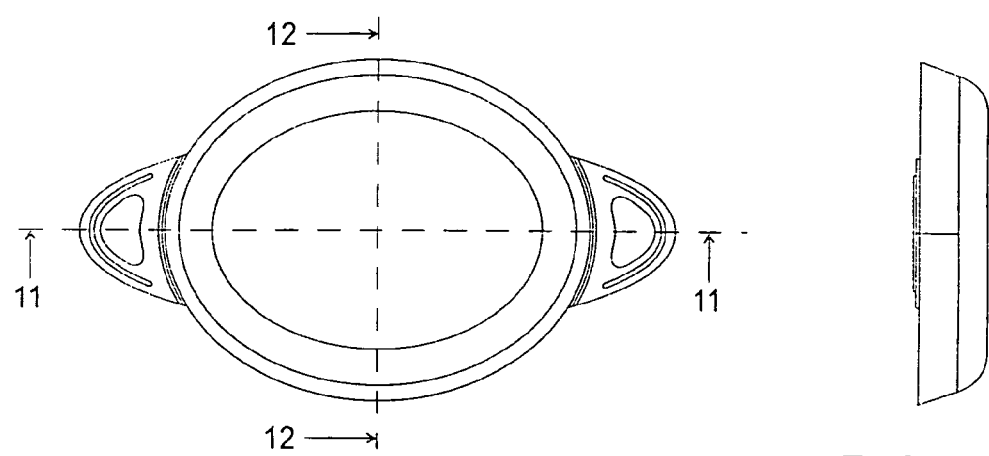
FIG. 15a
FIG. 15c
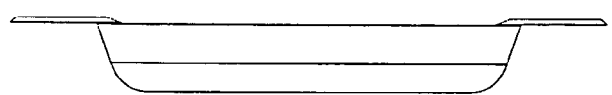
FIG. 15b

ROASTER

CROSS REFERENCE TO RELATED APPLICATION

This application is based on Provisional Patent Application No. 60/347,531, filed Jan. 11, 2002.

BACKGROUND OF THE INVENTION

This invention relates to devices for cooking food. In particular, this device relates to a contact roaster.

When cooking a large food item such as a chicken, duck, or pot roast, a cook must turn to a high capacity cooking device. In the past, high capacity cooking devices including, as examples, roaster ovens, slow cookers, and oven broilers have attempted to meet this need. Each, however, has its drawbacks.

For example, a conventional oven broiler is fixed in place, unwieldy to operate, and difficult to clean. Slow cookers are often portable, but typically heat food unevenly, particularly when they incorporate a glass cover. Prior roaster ovens typically provided heating elements limited in number and position, while requiring a complex mechanical assembly for rotating food past the heat elements. The heat elements were often exposed, leading to inadequate heat intensity for cooking the food item and failing to seal in juices. Instead, the food dried out significantly during cooling. Furthermore, grease drainage can be inadequate and messy, often leaving the food item to cook in its own grease.

A need has long existed in the industry for a roaster that addresses the problems noted above and others previously experienced.

BRIEF SUMMARY OF THE INVENTION

One embodiment of the roaster includes an upper pan including an upper side wall and an upper pan heating element inside the upper pan. The roaster further includes a lower pan connected to the upper tub, the lower pan including a lower side wall and a lower pan heating element inside the lower pan. A hinge may be used to connect the lower pan to the upper pan.

The roaster may include: an upper pan fixed temperature regulator and a lower pan fixed temperature regulator. The upper pan fixed temperature regulator may be preset to a first selected temperature, and the lower pan fixed temperature regulator may be preset to a second identical or different selected temperature. The temperature regulators may be thermostats, for example, although other temperature sensing or feedback mechanisms are also suitable. The roaster may also include a grease drain opening through the lower pan. A grease tray positioned underneath the opening could collect grease draining from food being cooked.

The electrical system of the roaster includes timer control circuitry and temperature control circuitry that is coupled to the upper pan heating element and the lower pan heating element. The temperature control circuitry or the timer control circuitry may be implemented, for example, using a microcontroller coupled to a memory (or with onboard memory) which stores instructions for execution by the microcontroller.

A time display coupled to the timer control circuitry may also be provided. The time display shows, as examples, the amount of time remaining in an initial pre-heat cycle or the cooking time remaining for the food in the roaster. In order to set cooking time, the roaster includes a control interface that includes, in one embodiment, a time increment button and a time decrement button.

Other implementations, methods, features and advantages of the invention will be or will become apparent to one with skill in the art upon examination of the following figures and detailed description, It is intended that all such additional systems, methods, features and advantages be included within this description, be within the scope of the invention, and be protected by the accompanying claims.

BRIEF DESCRIPTION OF THE DRAWINGS

FIGS. 15a, 15b and 15c, show the top plan front elevational and side elevational views of the casserole tray of FIG. 14.

DETAILED DESCRIPTION OF THE INVENTION

Figure 1:
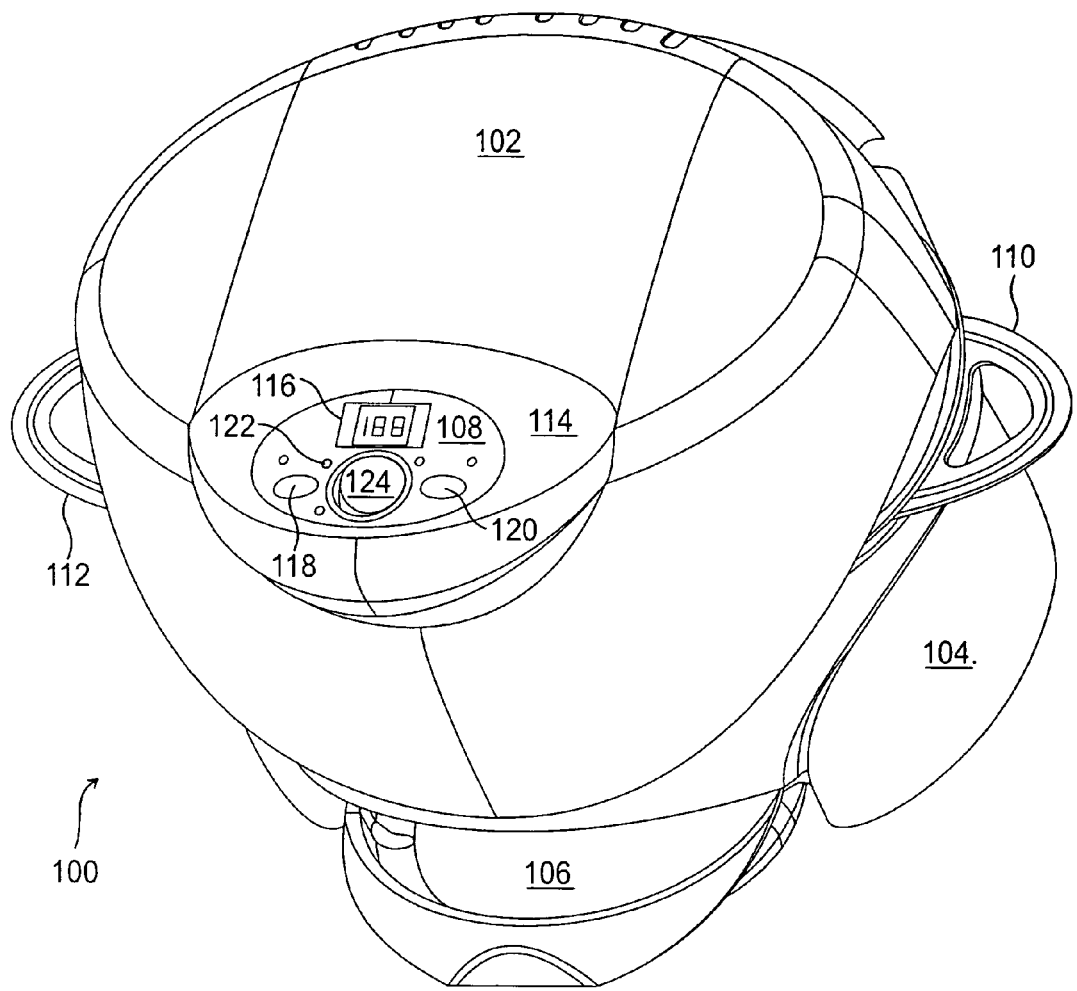
FIG. 1 shows a perspective view of one potential embodiment of the roaster in the closed position.
Figure 23:
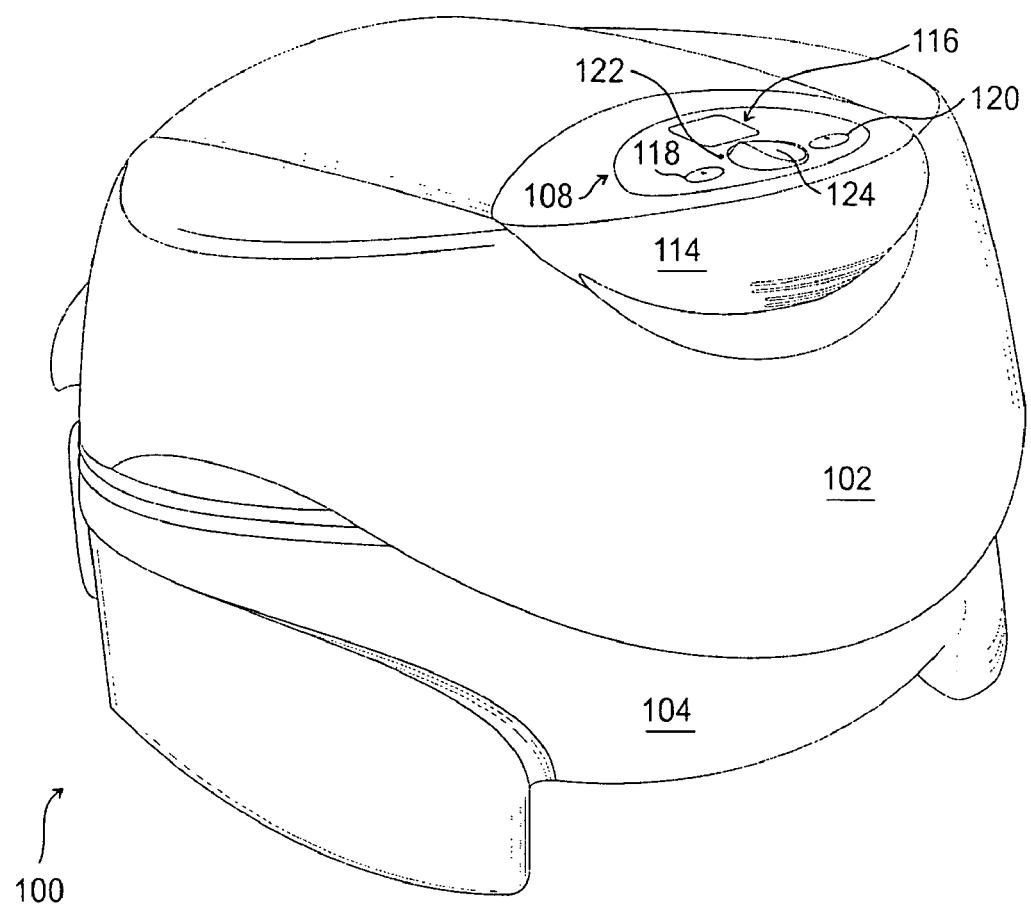
FIG. 23 shows a perspective view of the roaster of FIG. 1.

FIGS. 1 and 23 show perspective views of the roaster 100 in a closed configuration. The roaster 100 includes a lid 102, a base 104, and may include a drip pan 106 (FIG. 1). A time control operator interface 108 is provided. Casserole pan handles 110 and 112 for the optional casserole pan are also visible in FIG. 1.

A handle 114 is attached to the lid 102 to allow an operator to easily open and close the roaster 100. The handle 114 also incorporates the operator interface 108. The operator interface 108 includes a time display 116 (e.g., a 2.5 digit seven segment display), a time increment button 118, a time decrement button 120, an on/off indicator 122 (e.g., a light emitting diode), and an on/off switch 124 (e.g., a two position rocker switch). Other switch types (such as momentary contact and slide switches) may be utilized as well as other types of displays such as a plurality of LCDs or an LCD display for operator interface 108.

Figure 2:
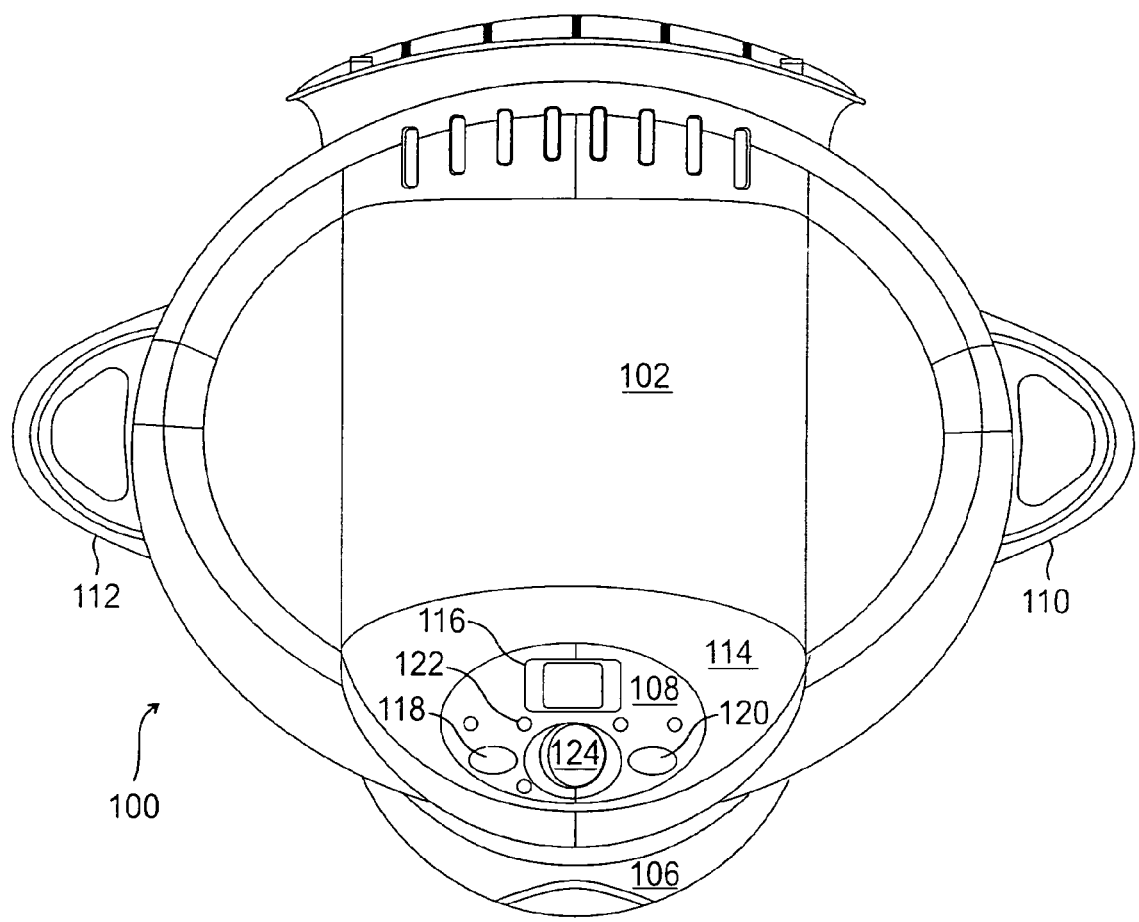
FIG. 2 illustrates top-down view of the roaster of FIG. 1 in the closed position.
Figure 3:
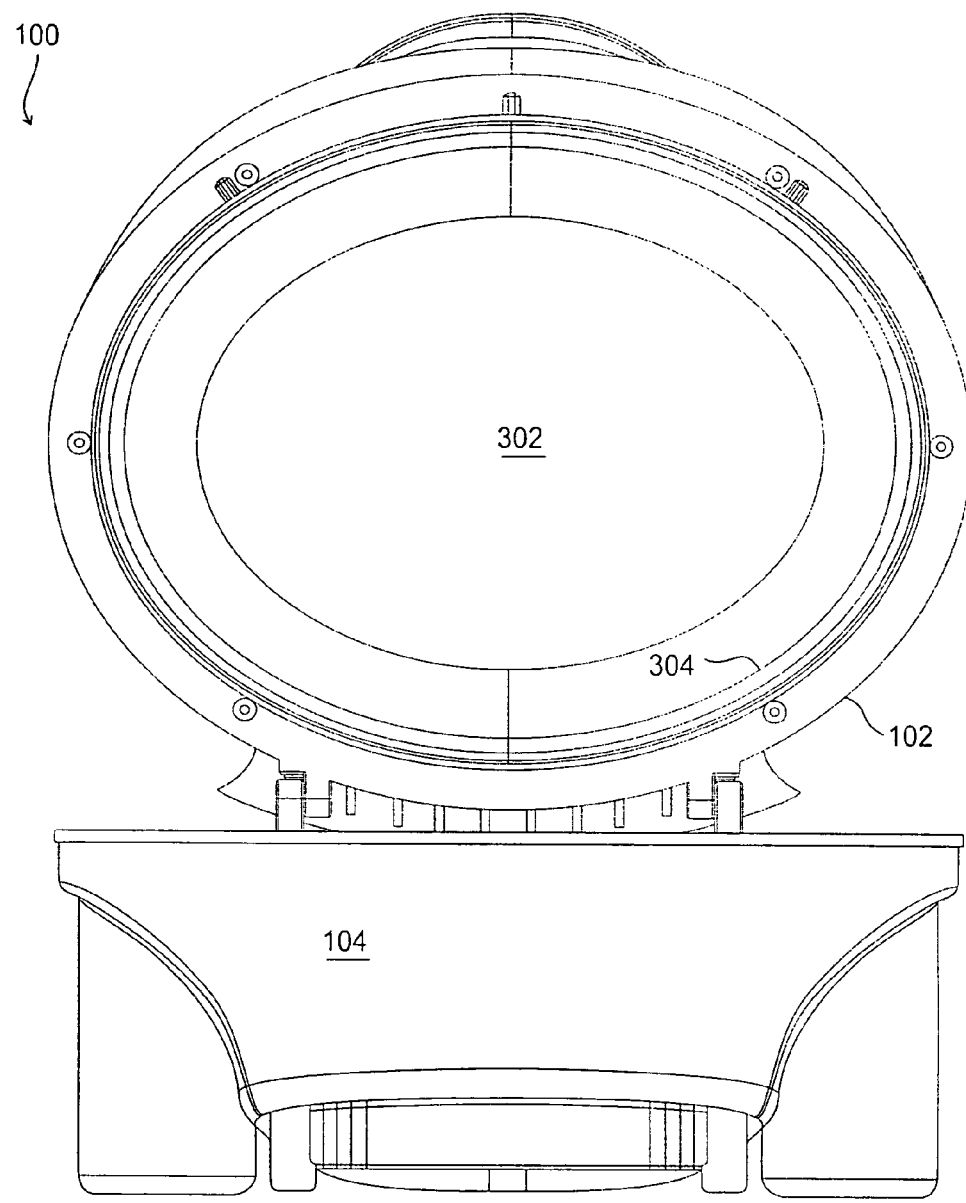
FIG. 3 is a front elevational view of the roaster of FIG. 1 in the open position.

FIG. 2 shows a top down view of the roaster 100. FIG. 3 is a frontal view of the roaster in its open configuration. In particular, FIG. 3 shows the upper pan 302 including the upper side wall 304. Similarly, a lower pan 402 including a lower side wall 404 (see FIG. 4) is present in the base 104. The lid 102, base 104, upper pan 302 and lower pan 402 are preferably oval shaped, although other shapes are also suitable (e.g., round). In one embodiment, the upper pan 302 and lower pan 402 are formed from high pressure diecast aluminum with an anti-stick (e.g., Teflon) coating.

Figure 4:
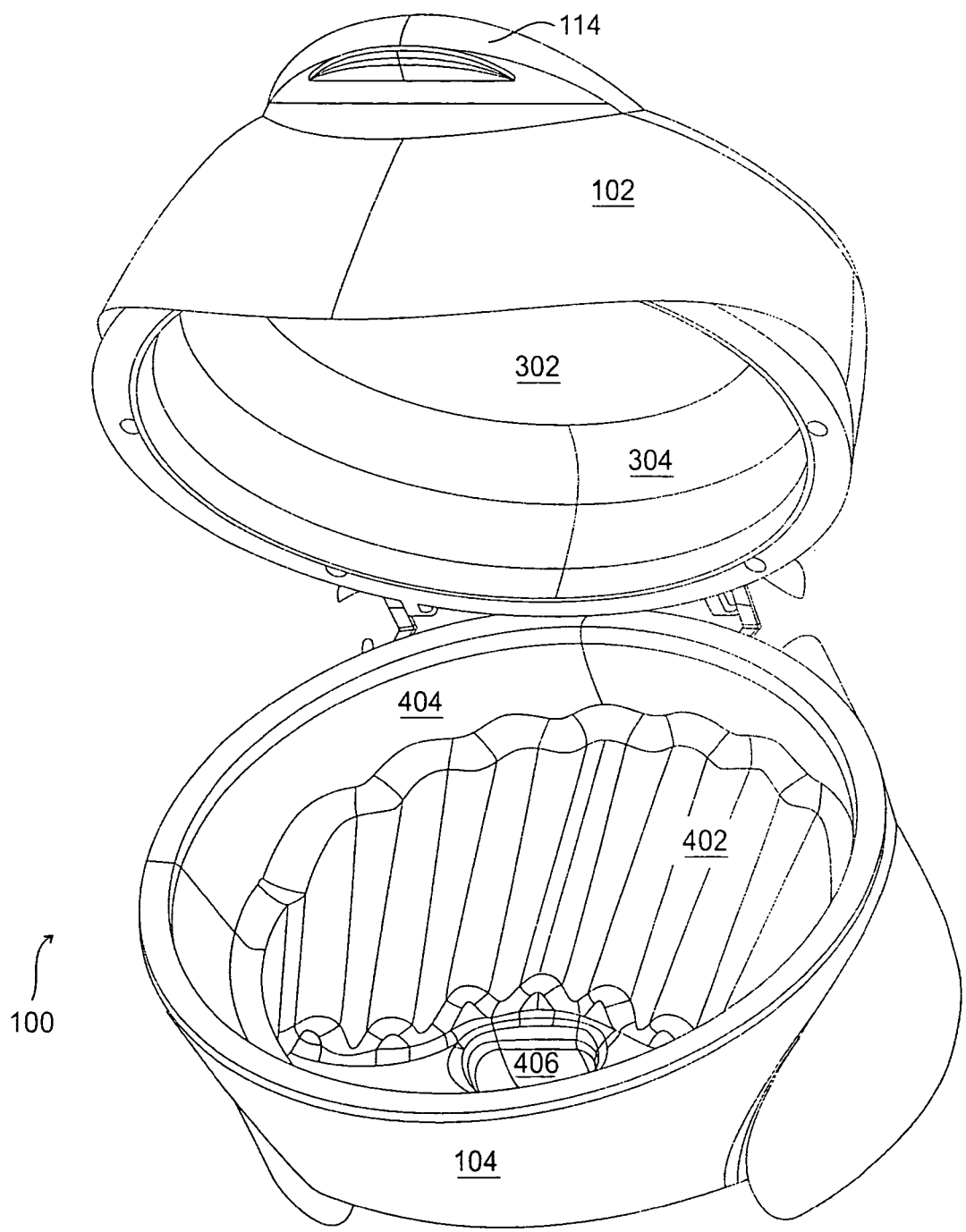
FIG. 4 is a perspective view of the roaster of FIG. 1 in the open position.

FIG. 4 also illustrates the grease drain opening 406, which is inside the lower pan 402 of roaster 100. Thus, grease may drain while the roaster is in the closed cooking position. The drip pan 106 (see, e.g., FIGS. 1 and 2) slides into a recess underneath the lower pan 402 such that it can be situated under the grease drain opening 406. Preferably, the drip pan 106 slides freely underneath the roaster 100, although in other embodiments, the drip pan 106 may lock into place, or slide on guide rails, or the like.

The upper pan 302 and lower pan 402 provide a large cooking volume in which to cook large food items. Thus, rather than flat plates that are suitable for limited purposes (e.g., thin hamburgers, chicken breast patties, grilled cheese sandwiches and the like), the upper pan 302 and lower pan 402 form a volume that allows the operator to cook whole chickens, roasts, and the like. In one embodiment, the upper pan 302, lower pan 402, with their respective upper side wall 304 and lower sidewall 404 provide an enclosed cooking volume of approximately 3.9 quarts, although the pans 302 and 402, and sidewalls 304 and 404 may be varied in size to meet other volumes.

Figure 5:
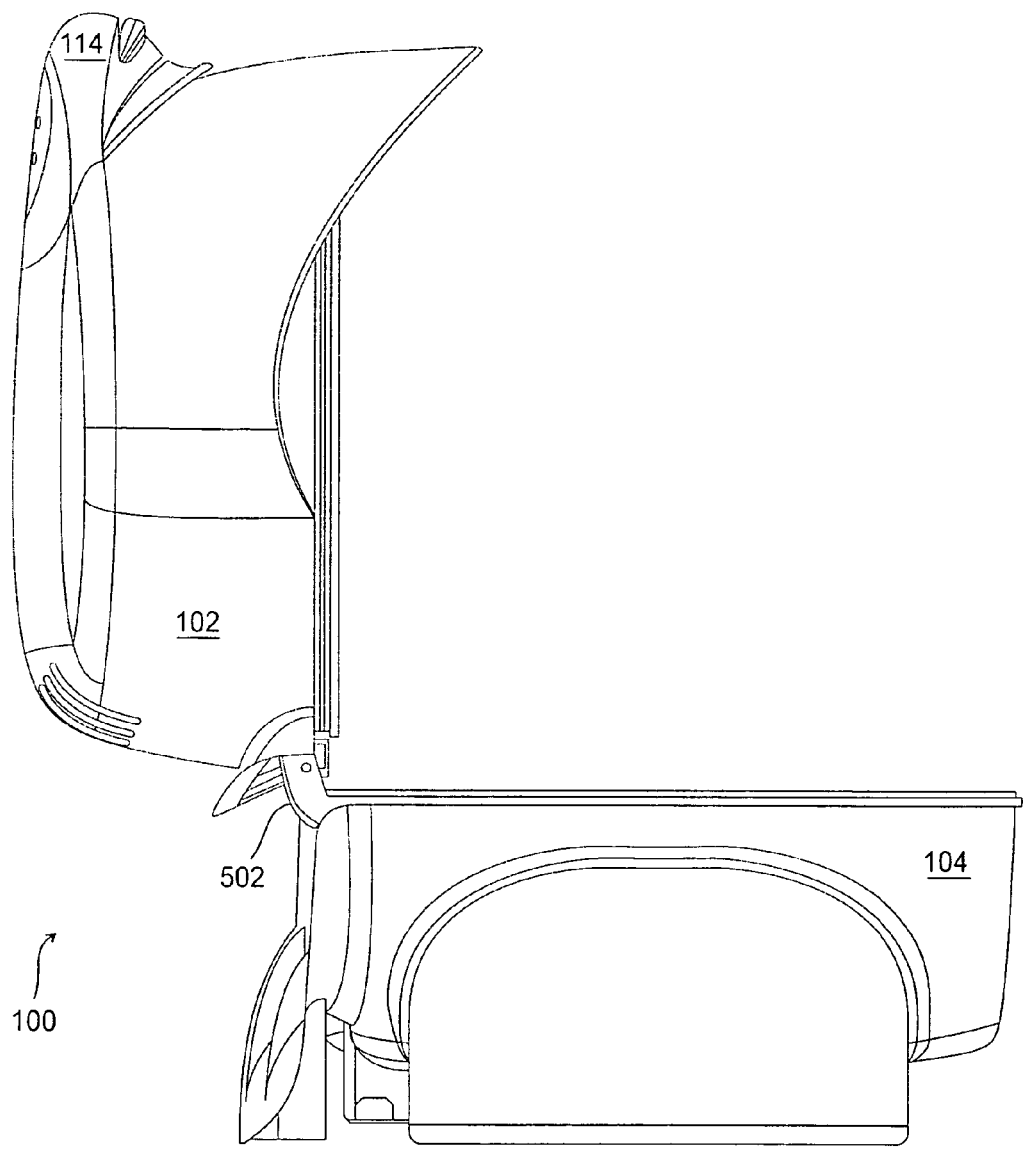
FIG. 5 is a side elevational view of the roaster of FIG. 1 in the open position.

FIG. 5 shows a side view of the roaster in its open configuration. From this view it can be seen that in the embodiment depicted in this application, the hinge 502 connects the lid 102 to the base 104. Other opening and closing mechanisms may be used in place of the hinge 502, however. The roaster 100 is thus opened by lifting on the lid 102 (and in particular, the handle 114).

Figure 6:
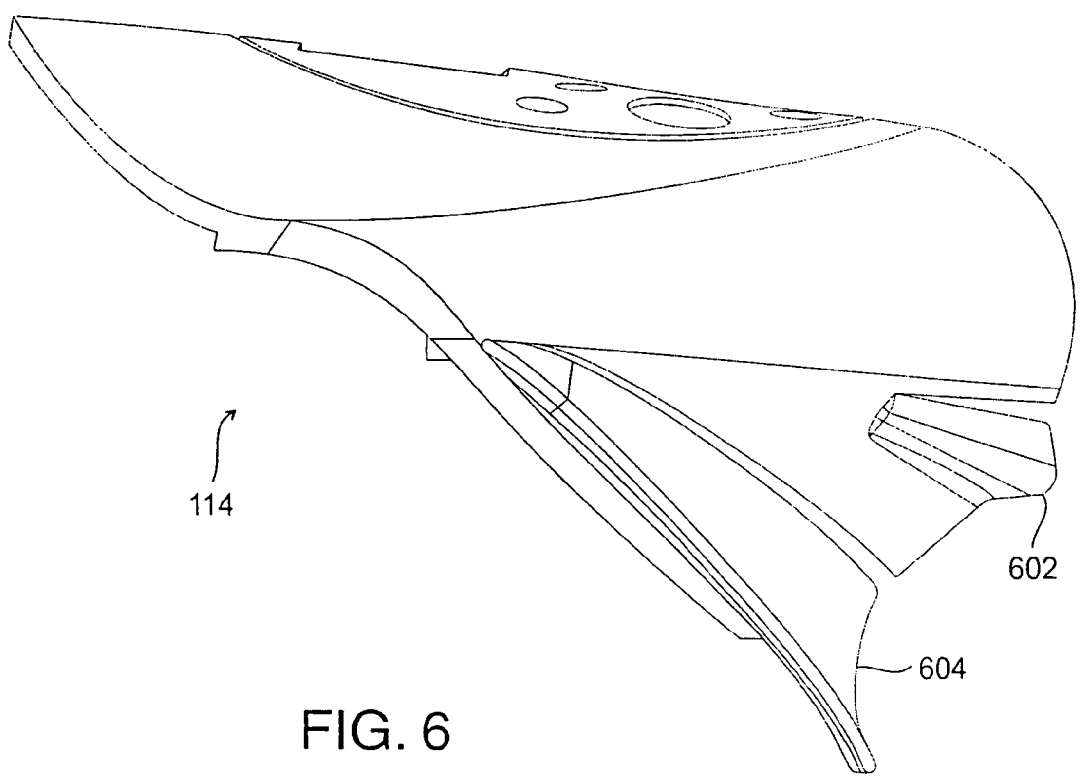
FIG. 6 shows a side view of the handle on the upper pan.

FIG. 6 shows a side view of the handle 114. As noted above, the handle 114 is attached to the lid 102. The handle 114 preferably includes the ridge 602 and the shield 604. The ridge 602 provides a convenient surface for application of force to open the roaster. The shield 604 provides a finger rest between the handle 114 and the lid 102.

Figure 7:
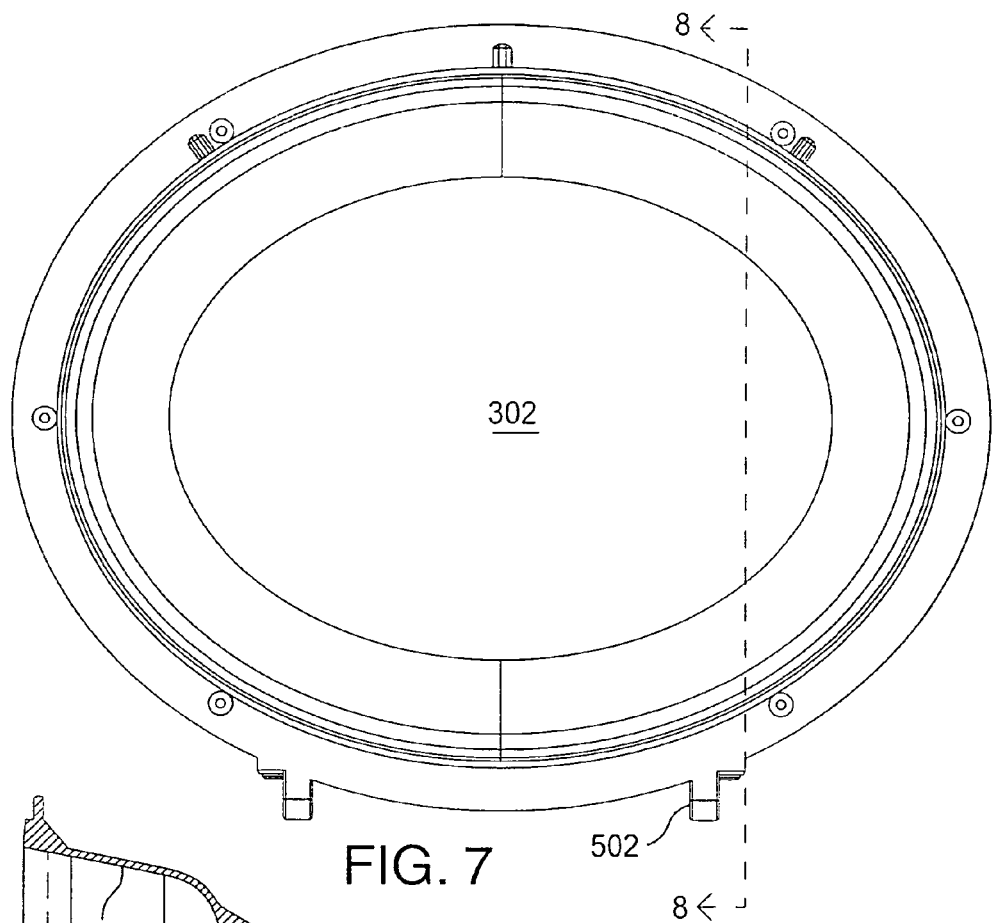
FIG. 7 is a bottom plan view of the upper pan of the roaster of FIG. 1.
Figure 8:
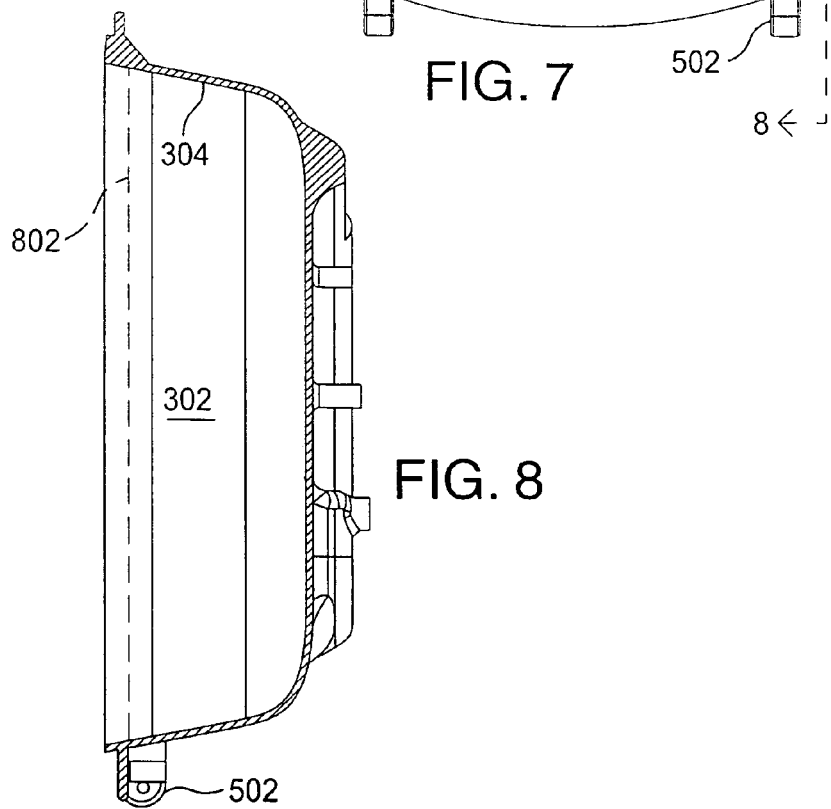
FIG. 8 is a side cross-sectional view of the upper pan of FIG. 7.
Figure 9:
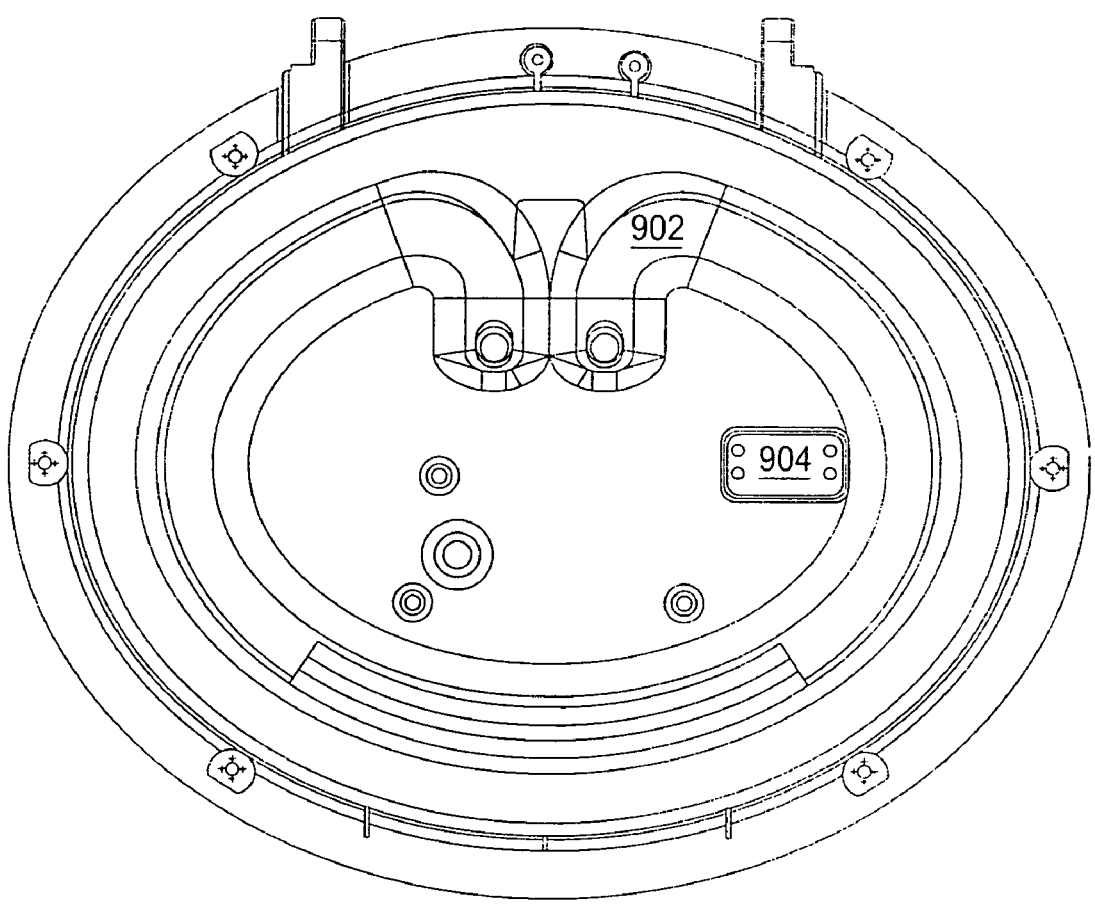
FIG. 9 is a top cross-sectional view of the upper pan of FIG. 7.

FIGS. 7–9 show various views of the upper pan 302. As shown, for example, in FIG. 9, the upper pan 302 includes an embedded heating element 902 and thermostat 904. The heating elements and thermostats embedded in the upper pan 302 and lower pan 402 of the roaster 100 will be discussed in more detail below with regard to the electrical system of the roaster. It is not necessary for the heating elements and thermostats to be embedded in either pan. Rather, they merely need to be thermally associated with their respective pans so that they can raise and sense the relative temperature of their associated pans, respectively. It is noted, however, that embedding the heating elements in the metal (e.g. diecast aluminum) produces greater heat intensity from the upper and lower pans 302, 402, and the upper and lower sidewalls 304, 404 than using separate free standing heat elements. As a result of the embedded heating elements, the roaster 100 more effectively seals in juices, while providing intense heat for cooking from all directions around the food. Thus, the roaster 100 does not simply provide planar heating (e.g., from a top plate and a bottom plate). Rather, the roaster 100 provides cooling heat around the entirety of the food being cooked.

In most instances, the food will generally be in direct contact with the lower pan 402 (due to gravity) but not the upper pan 302. For that reason, as will be described in more detail below, the roaster 100 preferably regulates the temperature of the upper pan 302 to a higher temperature than that of the lower pan 402. For example, the upper pan 302 may be set 20–100 degrees C. higher than the lower pan 402.

The roaster 100 may optionally support, in the upper pan 302, an anti-stick coated aluminum or steel insert that lowers the effective height of the upper sidewall 304. FIG. 8 shows an insert 802 across the upper pan 302. The insert 802 may conform to the shape of the upper pan 302 in much the same way that the casserole pan 1402 (discussed below with reference to FIG. 14) conforms to the shape of the lower pan 402. The insert 802 may snap or lock into place as an interference fit with the upper pan 302, or by using a latching or retaining mechanism (e.g., a screw or bolt) in the upper pan 302 or on the upper sidewall 304. By lowering the effective height of the upper sidewall 304, the operator, if desired, may provide direct heating contact on both the top and bottom surfaces of the food.

Figure 10:
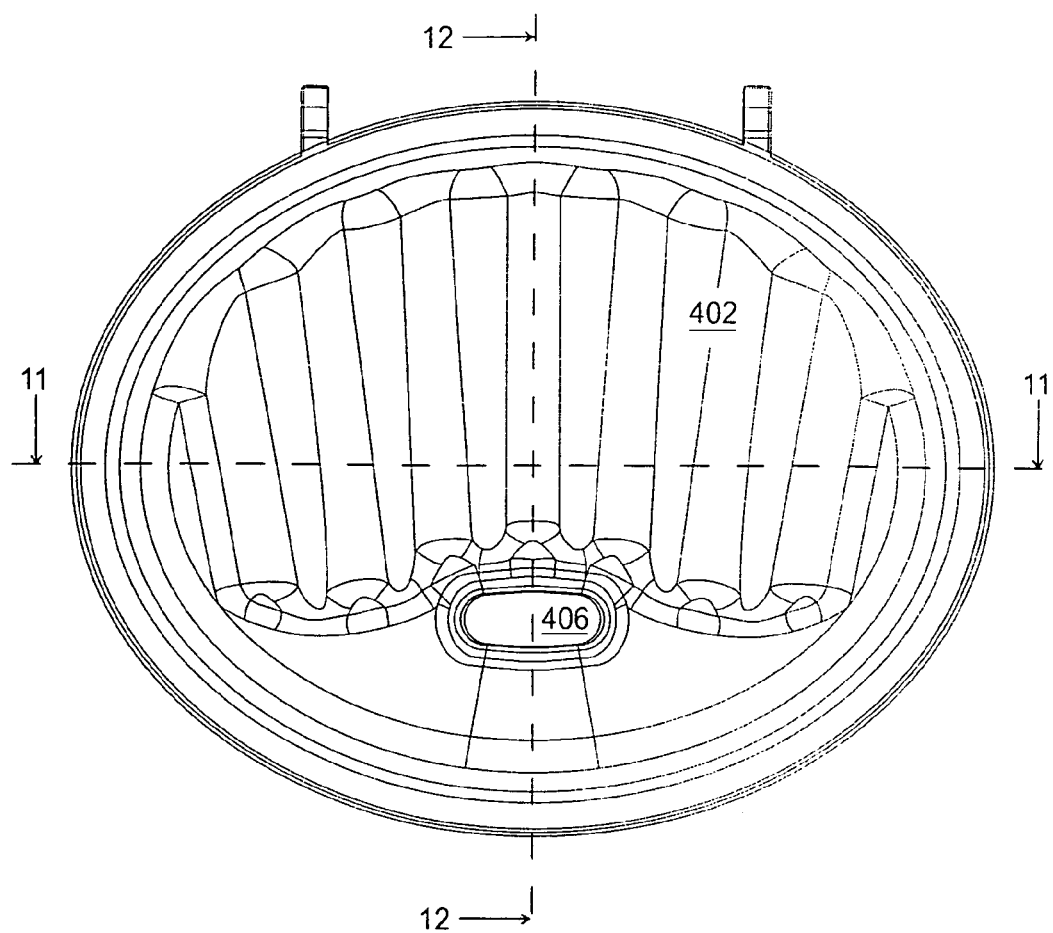
FIG. 10 is a top plan view of the lower pan of the roaster of FIG. 1.
Figure 11:
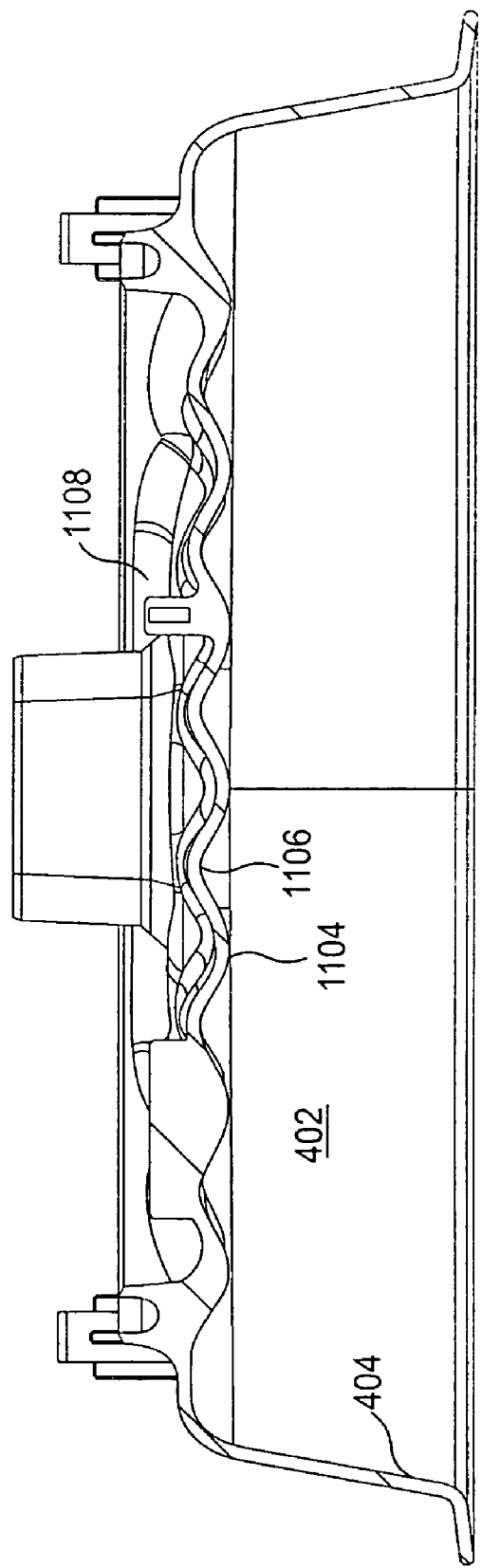
FIG. 11 is a cross-sectional view of the lower pan of FIG. 10 taken along section lines A—A.
Figure 12:
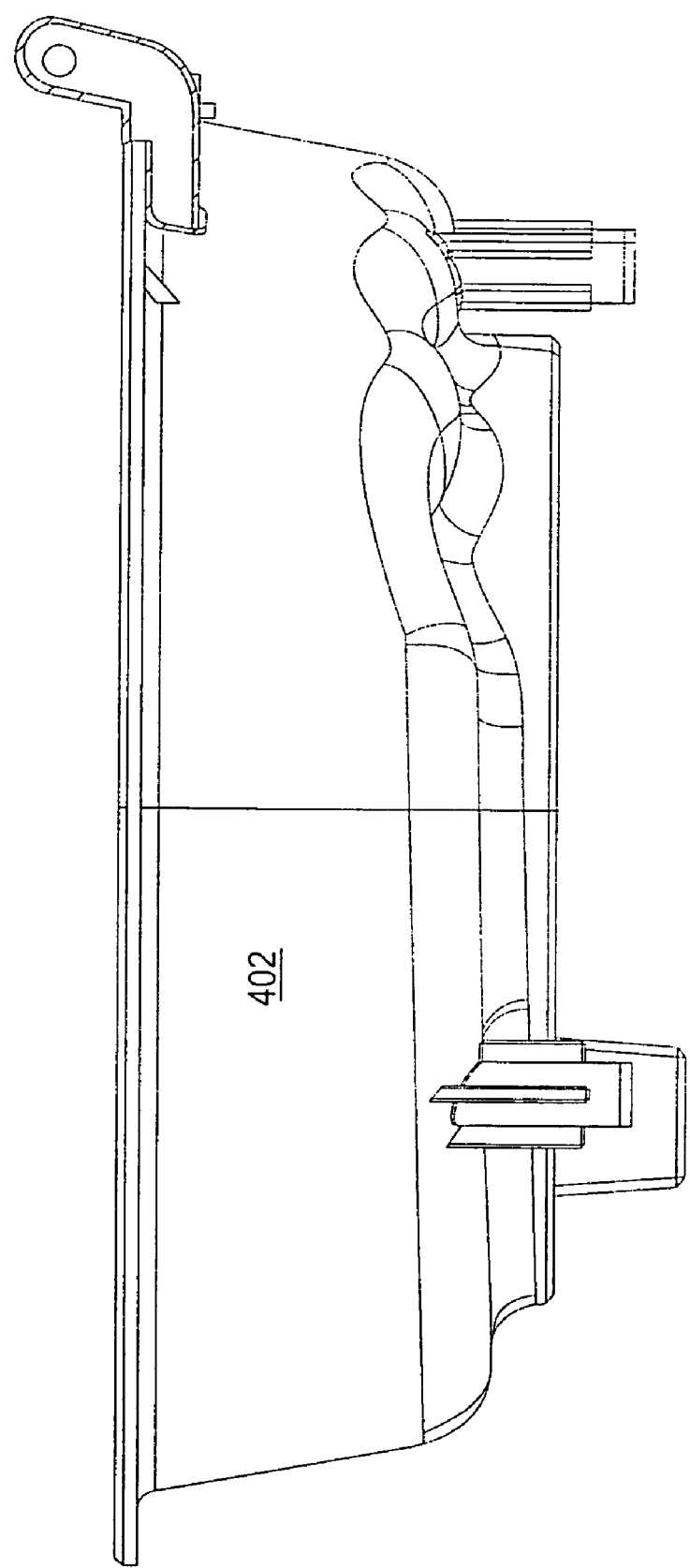
FIG. 12 is a cross-sectional view of the lower pan of FIG. 10 taken along section lines B—B.
Figure 13:
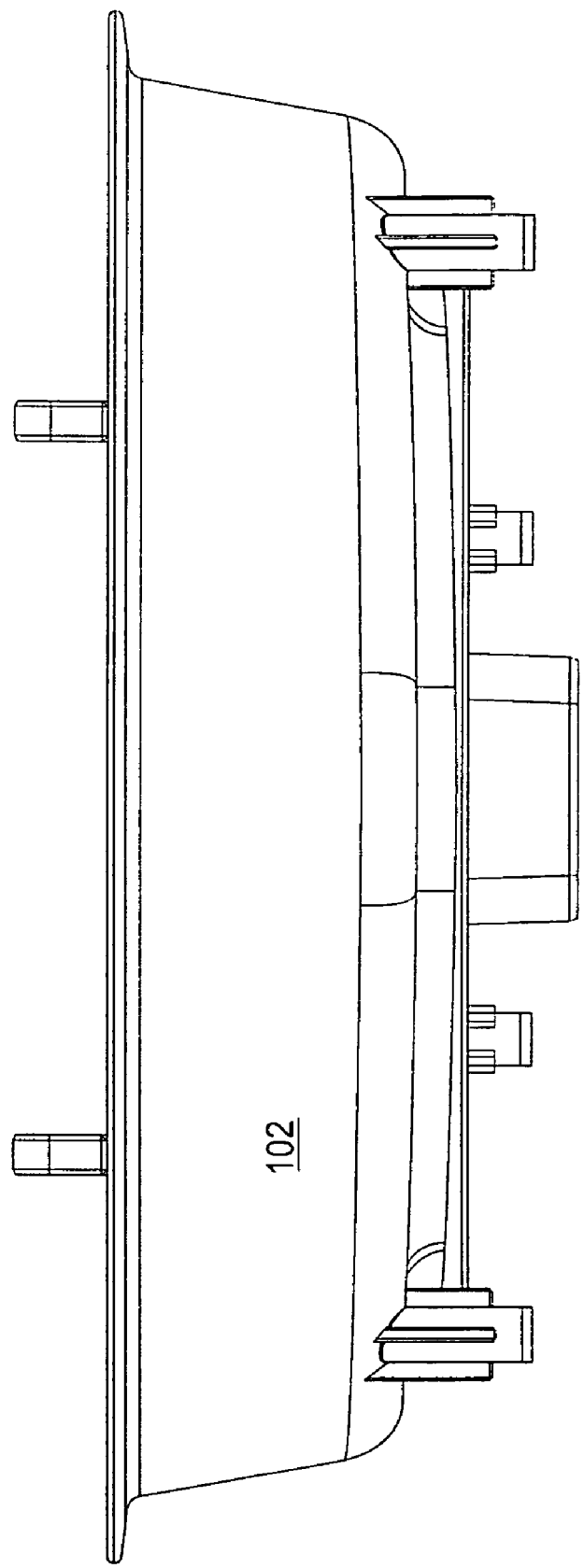
FIG. 13 is a front elevational view of the lower pan of the roaster of FIG. 1.

FIGS. 10–13 are various views of the lower pan 402. As shown in FIG. 11, for example, the lower pan 402 includes an embedded heating element 1108, and preferably ribs 1104 and valleys 1106 (see also FIGS. 4 and 10). The ribs 1104 and valleys 1106 help grease to drain from under the food being cooked so that the grease may flow down the lower pan 402—which is preferably inclined at a slight angle— toward the grease drain opening 406 and out of the lower pan, as shown in FIGS. 10 and 11. FIG. 11 also shows a plurality of legs that raise the bottom of the lower pan 402 so as to minimize the possibility of scratching the kitchen counter.

Figure 14:
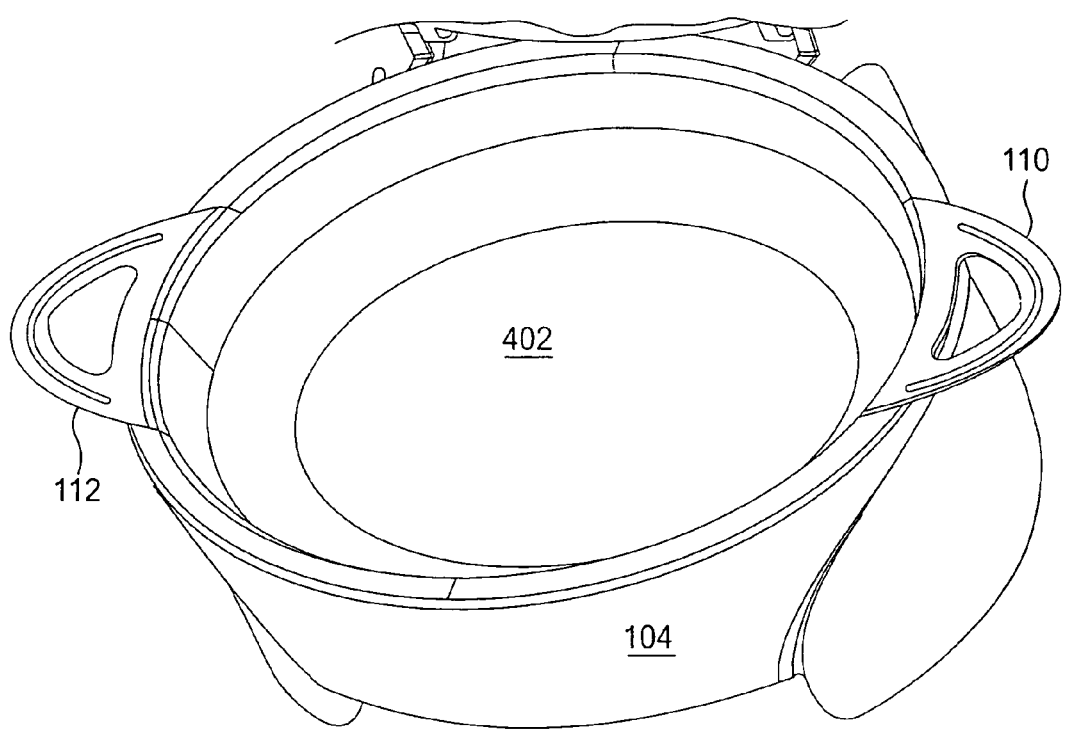
FIG. 14 illustrates a perspective view of the casserole tray as it has been inserted to the lower pan of the roaster of FIG. 1.

FIG. 14 shows a perspective view of the base 104 and the casserole pan 1402 with handles 110 and 112. The casserole pan 1402 preferably sits in substantial contact with the lower pan 402 and lower sidewall 404. The casserole pan 1402 is preferably formed from anti-stick, coated aluminum or steel. FIGS. 15*a*, 15*b* and 15*c* provide additional views of the casserole pan 1402.

The casserole pan 1402 is heated by the lower pan 402 and lower sidewall 404, but also receives heat from the upper pan 302 and the upper sidewall 304. The casserole pan 1402 provides a convenient dish in which food may be both baked and served.

Table 1, below, provides a summary of characteristics for one embodiment of the roaster 100.

TABLE 1

| | |
|---|---|
| Total capacity | 3.9 Quarts (3.7 liter) |
| Cooking pan capacity | 1.8 Quarts (1.7 liter) |
| Lid capacity | 2.1 Quarts (2.0 liter) |
| Internal Height (closed) | 4"–4.4" (100–110 mm) |
| External Height (closed) | 8.9" (225 mm) |
| Internal Length × width | 9.9" × 8.1" (250 mm × 205 mm) |
| External Length × width | 11.5" × 11.2" (290 mm × 283 mm) |
| Drip Tray capacity | 0.35 quarts (0.33 liter) |
| Drip Tray dimensions (L × W × H) | 6.3" × 5.9" × 1" (160 mm × 150 mm × 25 mm) |
| Casserole pan dimensions (L × W × H) | 7.9" × 9.9" × 2" (200 mm × 250 mm × 50 mm) |
| Dimension across casserole pan-handles | 13.8" (350 mm) |
| Voltage input | 240 VAC or 120 VAC |
| Power switch | On/Off with LED indicator |
| Element wattage | 1400 Watt |
| Current draw | 5.8 Amps @ 240 VAC 11.7 Amps @ 120 VAC |
| Temperature control | Automatic fixed temperature thermostats in lid and base |
| Over temperature safety | 1 one shot thermal fuse in lid |
| Maximum operating temperature | 302 degrees F. in base and 410 degrees F. in lid (150 degrees C. and 210 degrees C.) |
| Timer | 3 digit display of elapsed time with warning buzzer |
| Time set | Up/Down buttons |
| Handle Material | Polypropylene |
| External body and cover material | Painted Phenolic |
| Upper and Lower pan Material | High pressure diecast aluminum Teflon coating on internal surfaces |
| Casserole pan material | Teflon coated aluminum/steel |
| Cable | Permanently wired to unit with plug |

Figure 16:
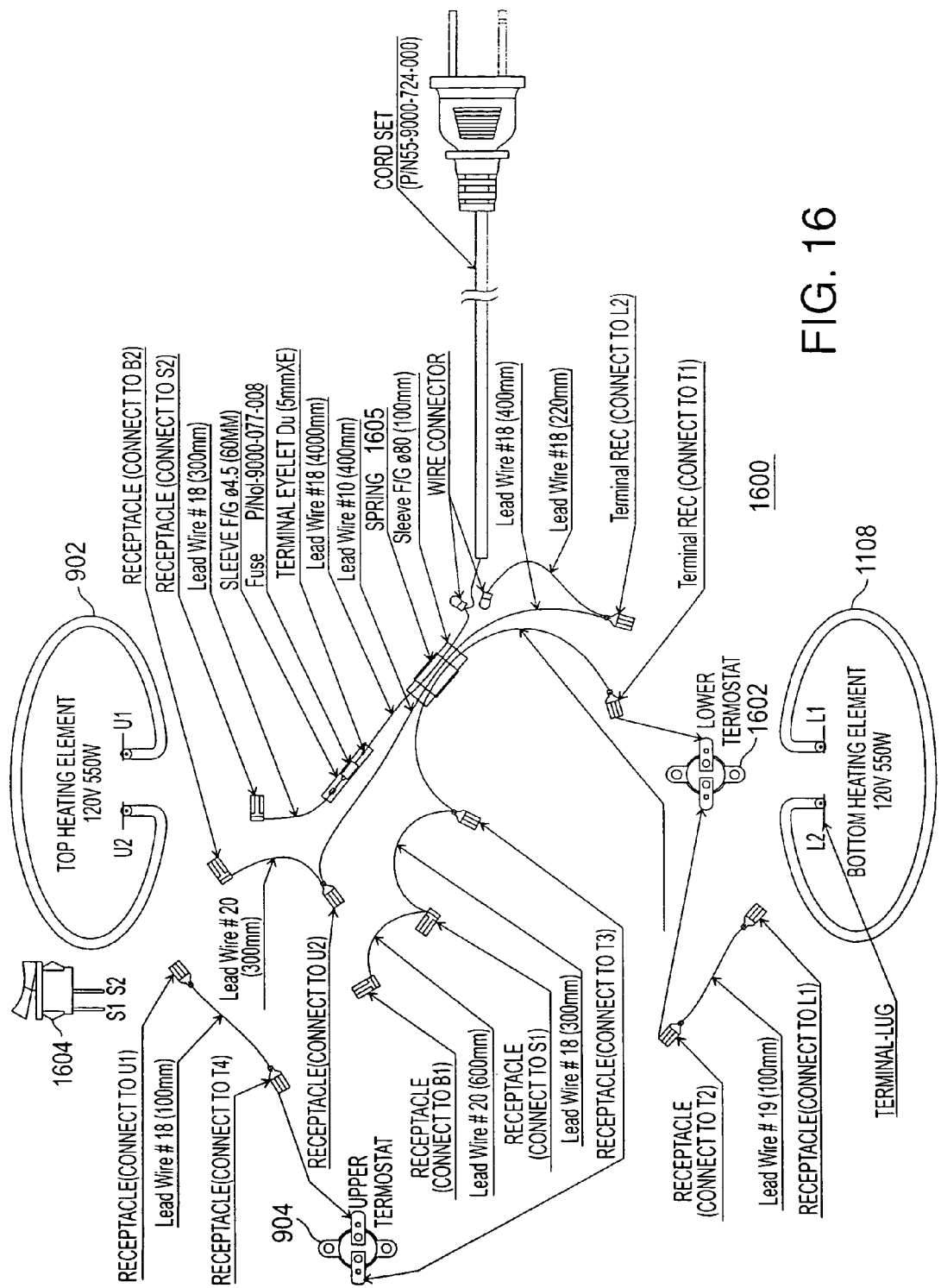
FIG. 16 depicts a wiring diagram for the roaster of FIG. 1.

FIG. 16 shows one potential wiring diagram for the roaster 100. The wiring diagram includes the wiring harness 1600 and temperature control circuitry. The temperature control circuitry includes the upper heating element 902 and upper thermostat 904, as well as the lower heating element 1108 and the lower thermostat 1602. An on/off switch 1604 for the roaster 100 is also shown. Table 2, below, summarizes characteristics of the thermostats and heating elements.

TABLE 2

| | |
|---|---|
| Upper heating element | 120 V, 550 W |
| Lower heating element | 120 V, 550 W |
| Upper thermostat | Opening Temperature: 195 degrees C. ± 9 degrees C. Closing Temperature: 175 degrees C. ± 11 degrees C. 120/250 VAC, 10 A |
| Lower thermostat | Opening Temperature: 150 degrees C. ± 9 degrees C. Closing Temperature: 135 degrees C. ± 11 degrees C. 120/250 VAC, 10 A |

FIG. 16 also shows a spring 1605. The spring is a nickel plated mild steel spring tube that protects the wiring harness where it exits the base 104 and enters the lid 102.

Figure 17:
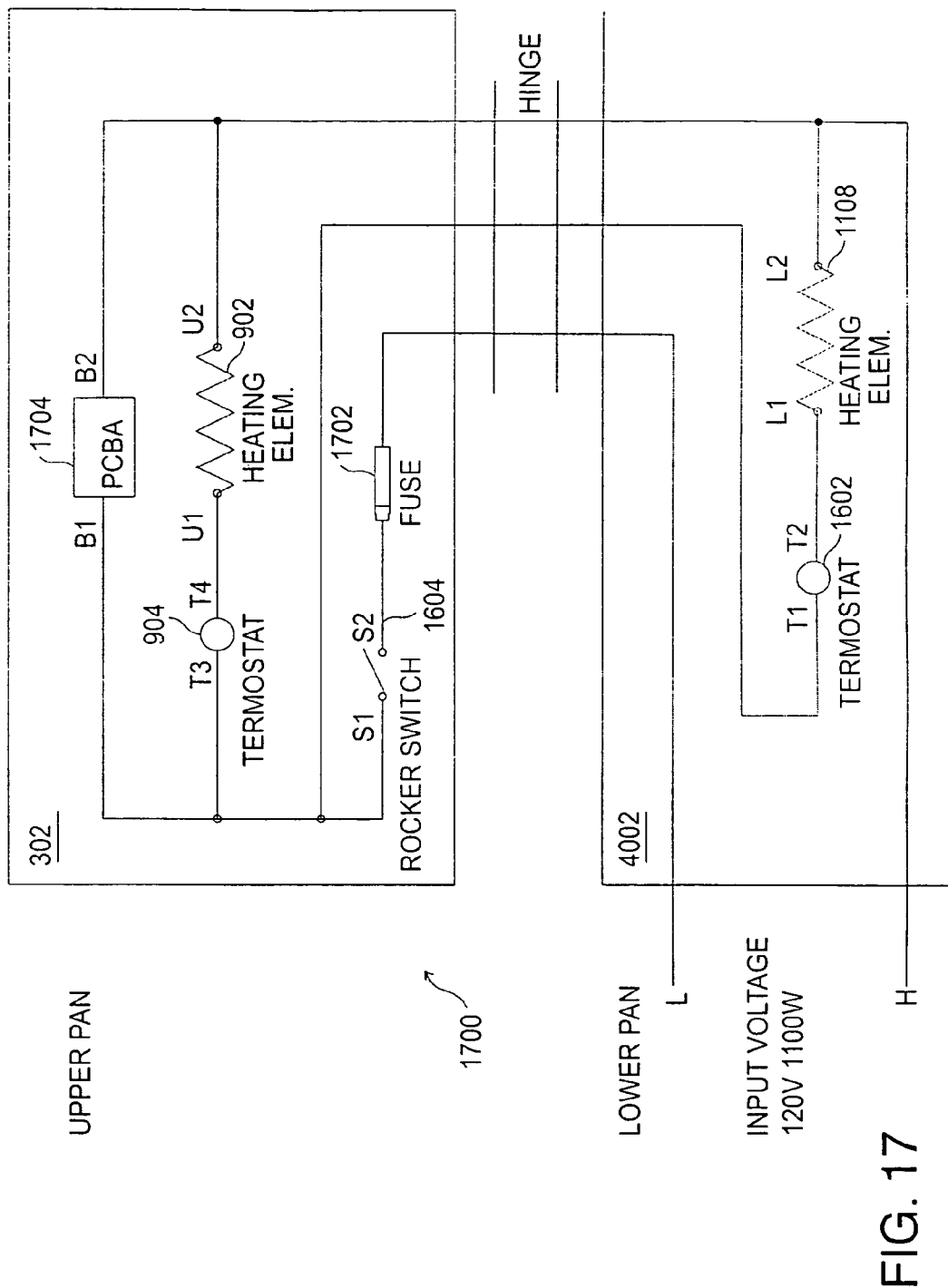
FIG. 17 is a schematic diagram of the wiring for one potential embodiment of the temperature control circuitry.

FIG. 17 is one potential wiring diagram 1700 for the roaster, including the temperature control circuitry. The rocker switch 1604 serves as an on/off switch. The wiring diagram is divided between the upper pan 302 and the lower pan 402. The upper pan 302 includes the upper heating element 902 and the upper thermostat 904, a fuse 1702 (e.g., a 250V, 10 A or 120V, 15 A fuse), and a timer circuit board 1704. The lower pan 402 includes the lower heating element 1108 and the lower thermostat 1602.

When an operator switches on the roaster 100, the thermostats 904, 1602 close to initiate heating of the heating elements 902, 1108. When the heating elements 902, 1108 reach a preselected temperature (as sensed by the thermostats 904, 1602), the thermostats 904, 1602 open to prevent additional heating of the heating elements 902, 110S. As noted above, the thermostats may be set to provide different temperature control for the upper pan 302 and the lower pan 402.

Figure 18:
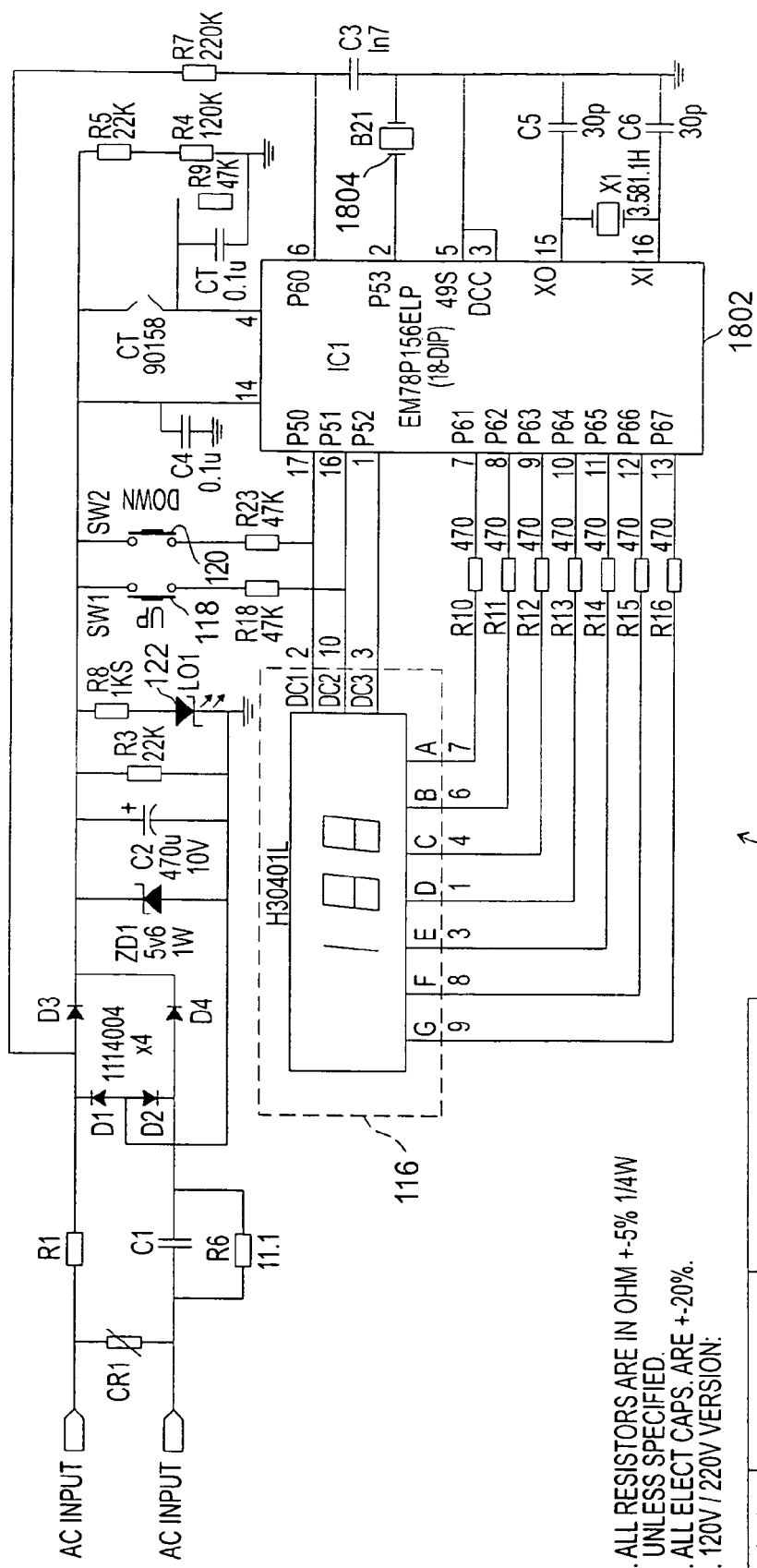
FIG. 18 shows a schematic diagram for one potential embodiment of the timer control circuitry.

FIG. 18 shows one potential implementation of timer control circuitry 1800 present on the timer circuit board 1704. The timer control circuitry 1800 includes a microcontroller 1802 coupled to the time display 116 (e.g., a 2.5 digit seven segment display) and a control interface that includes a time increment button 118 and a time decrement button 120. The power indicator 122 illuminates when the roaster is connected to an AC line voltage, and extinguishes when the connection is removed, while the buzzer 1804 provides an audible alarm or alert to the operator. The timer control circuitry 1800 uses the AC line frequency as a time base. The timer control circuitry 1800, as shown, provides a programmable count down tinier that supports an operator adjustable countdown time between 1 minute and 150 minutes.

When an operator switches on the roaster 100, the roaster 100 preferably enters a pre-heat countdown state under control of firmware in the microcontroller 1802. During the pre-heat countdown, the temperature control circuitry heats the upper pan and lower pan heating elements 902, 1108 under control of the upper and lower pan temperature regulators (e.g., the thermostats 904, 1602). The upper pan 302 and lower pan 402 reach the selected temperatures during the pre-heat countdown. As an example, a pre-heat countdown of 5–8 minutes may be provided, followed by activation of the buzzer 1804 to alert that operator that the pre-heat period has ended.

At the end of the pre-heat countdown, the microcontroller 1802 switches the roaster into an ON state. In the ON state, the microcontroller 1802 is responsive to the control interface. The operator may thereby use the time increment button 118 and time decrement button 120 to set and adjust a time value (e.g., in minutes). In one implementation, incrementing a time value that is already maximum (e.g., 150 minutes) will set the time value to a minimum time value (e.g., 1 minute). Similarly, decrementing the minimum time value will set the time value to the maximum time value. Furthermore, holding the time increment or time decrement button will increment or decrement the time value at a predetermined rate (e.g., 10 increments or decrements per second).

The time value represents the amount of time that remains before an alarm is generated for the operator. The microcontroller 1802 counts down the time value and updates the display accordingly. Once the time value has expired, the buzzer preferably alerts the operator (e.g., by beeping 4 times with a 1 second on and 0.5 second off cadence). In one implementation, pressing any button while the buzzer is beeping will turn off the buzzer.

Figure 19:
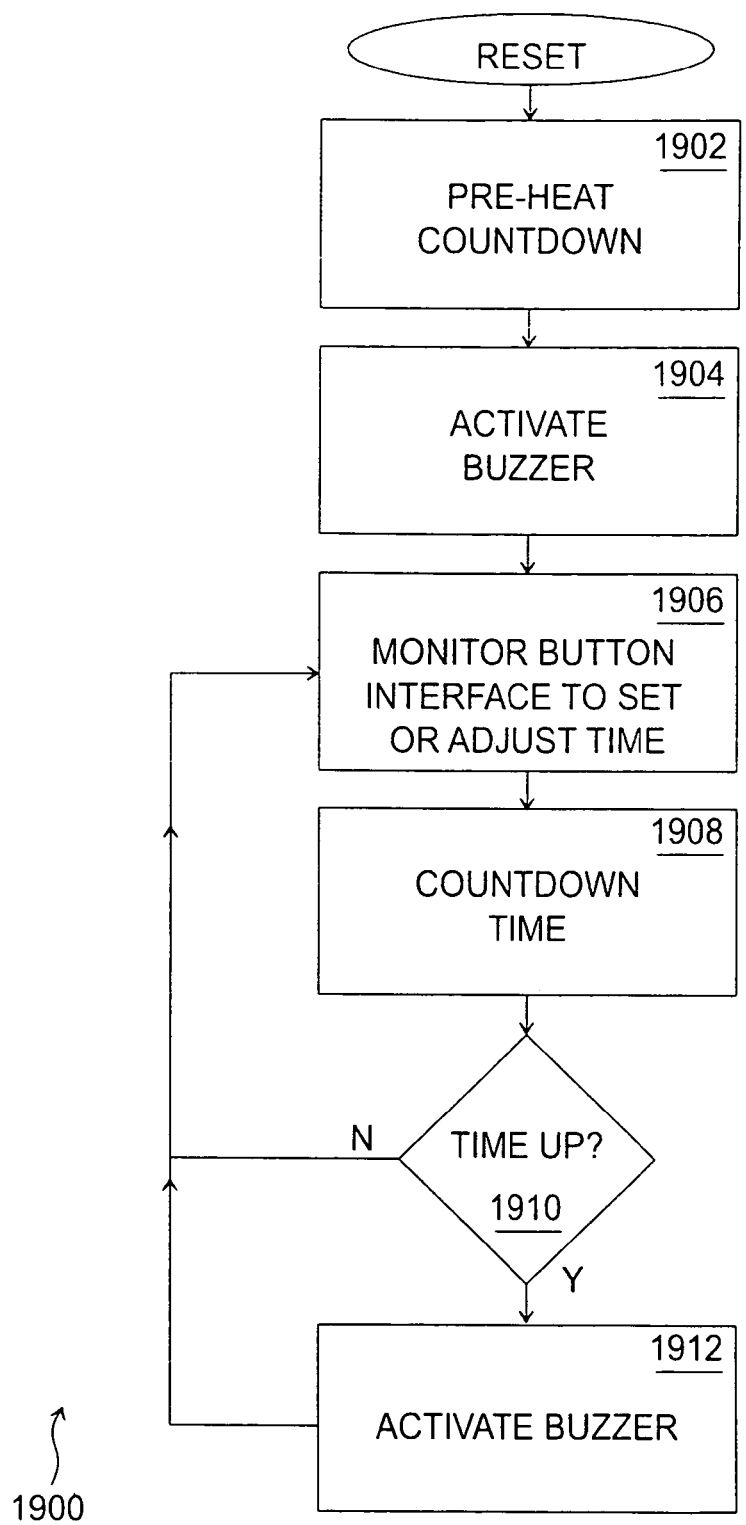
FIG. 19 shows a flow diagram for the firmware in one potential embodiment of the timer control circuitry.

FIG. 19 presents a flow diagram of the operation of the firmware in the microcontroller 1802. After reset, the microcontroller performs the pre-heat countdown (step 1902). When the pre-heat countdown is finished, the microcontroller 1802 activates the buzzer 1804 (step 1904). Subsequently, the microcontroller 11802 monitors the control interface to set the time (step 1906). The microcontroller 1802 counts down the time (step 1908), and checks to see if time has expired (step 1910). If so, then the microcontroller 1802 activates the buzzer 1912. In either case, the microcontroller returns to determine whether the operator is adjusting the time using the control interface.

Figure 20:
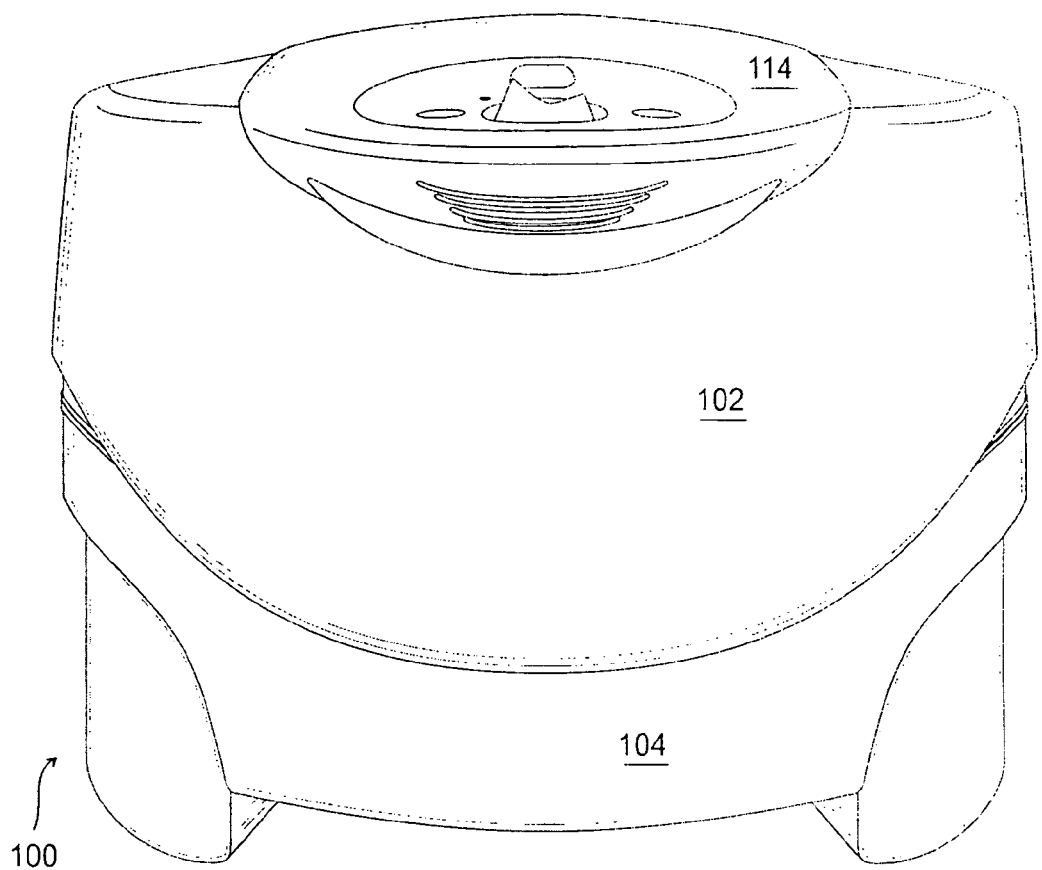
FIG. 20 presents a front elevational view of the roaster of FIG. 1 in the closed position.
Figure 21:
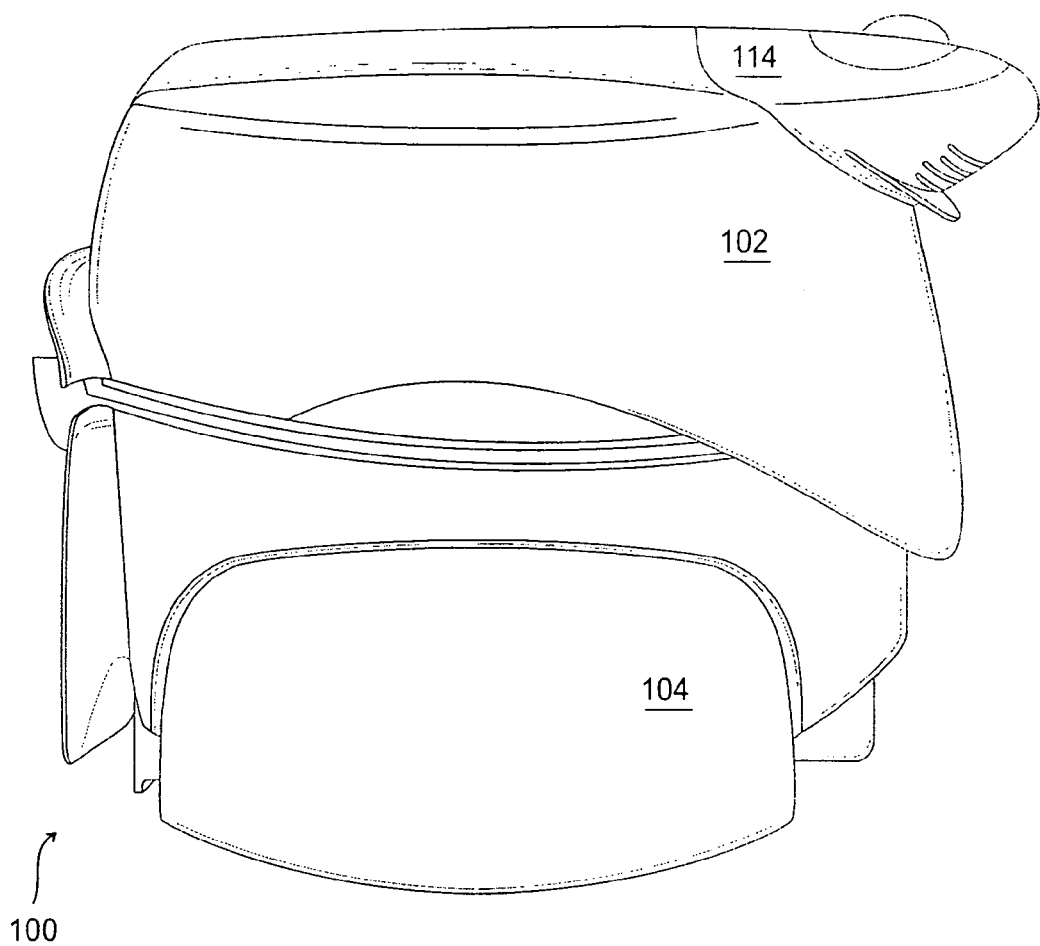
FIG. 21 shows a side elevational view of the roaster of FIG. 1 in the closed position.
Figure 22:
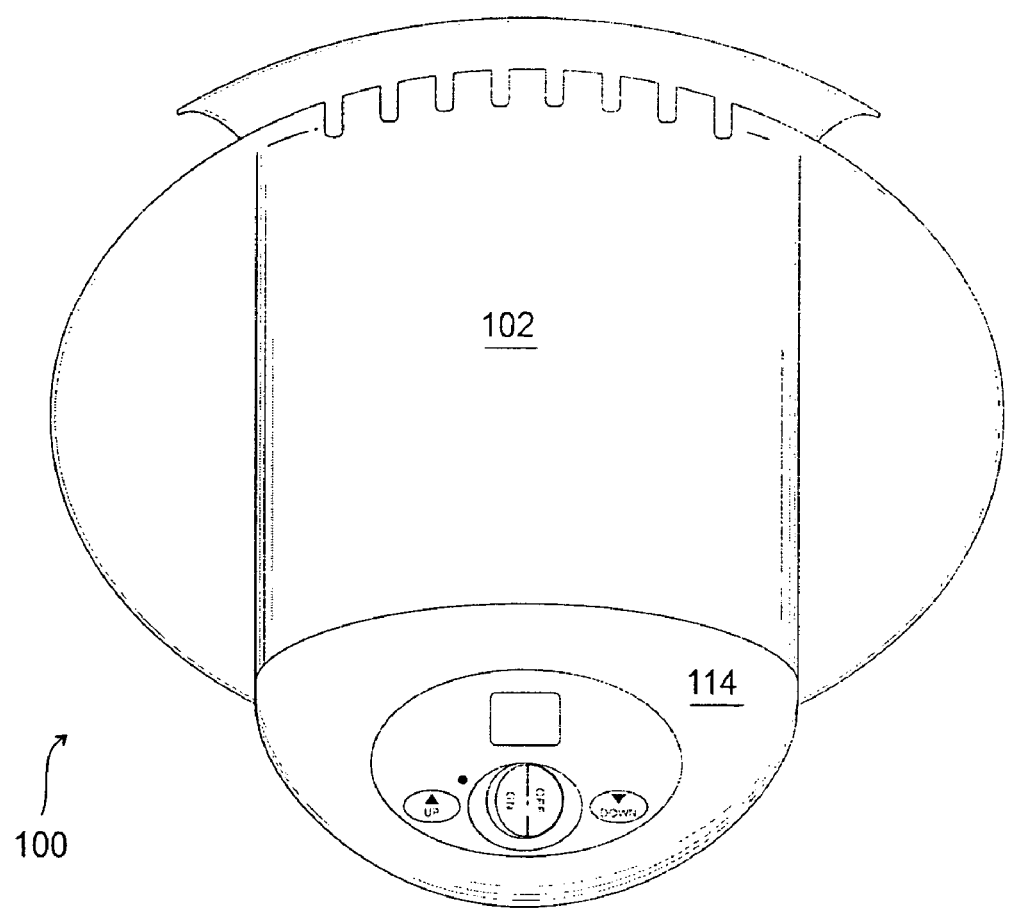
FIG. 22 presents a top plan view of the roaster of FIG. 1 in the closed position.
Figure 24:
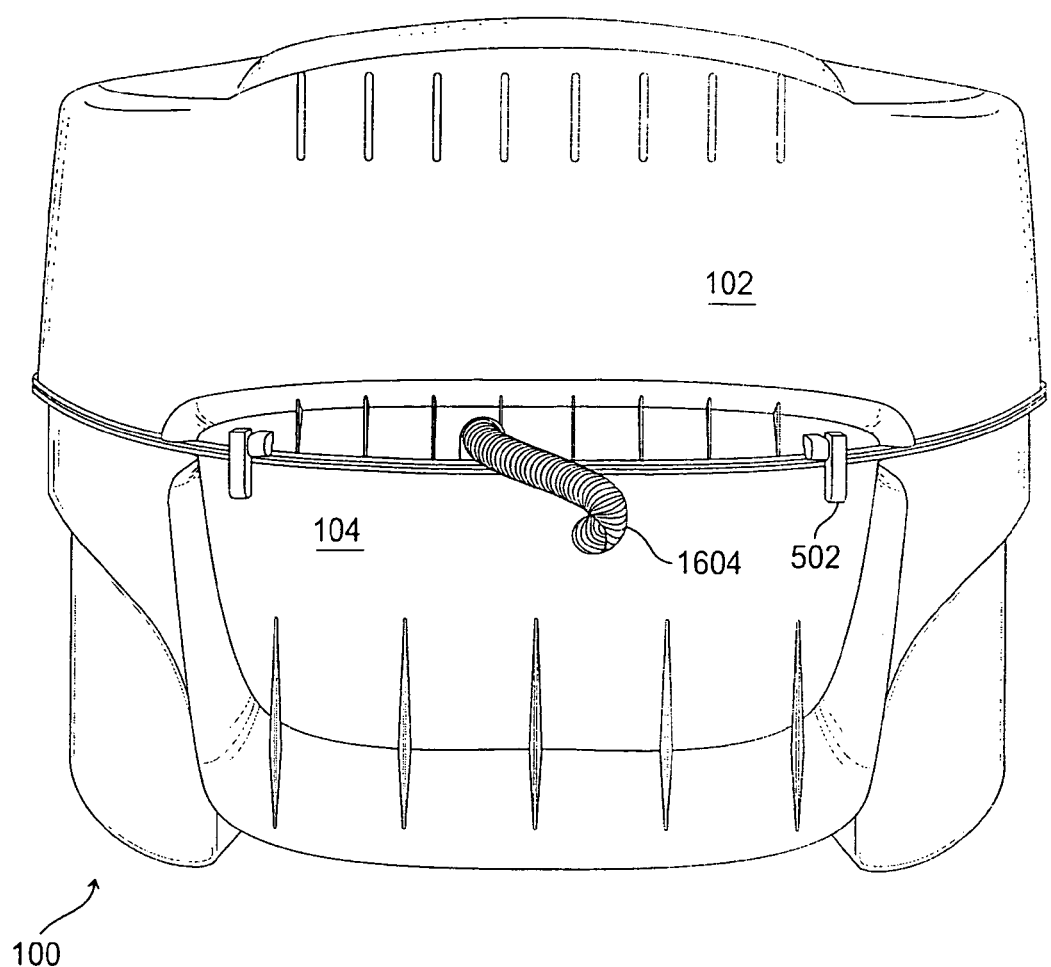
FIG. 24 illustrates a back elevational view of the roaster of FIG. 1.

FIGS. 20–24 present additional views of the roaster 100. In particular, FIG. 20 shows a front view of the roaster 100, FIG. 21 shows a side view of the roaster 100, FIG. 22 shows a top down view of the roaster 100, FIG. 23 shows a perspective view of the roaster 100, and FIG. 24 shows a back view of the roaster 100. While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A roaster comprising:
an upper pan including an upper side wall;
an upper pan heating element thermally associated with the upper pan;
a lower pan connected to the upper pan, the lower pan including a lower side wall; and
a lower pan heating element thermally associated with the lower pan, wherein at least one of the upper side wall or the lower side wall is thermally connected with at least one of the upper pan heating element or the lower pan heating element so as to provide cooking heat wherein the internal height of the roaster is greater than about 3 inches.

2. The roaster according to claim 1, further comprising:
an upper pan fixed thermostat disposed in thermal association with the upper pan and operably coupled to the upper pan heating element; and
a lower pan fixed thermostat disposed in thermal association with the lower pan and operably coupled to the lower pan heating element.

3. The roaster according to claim 2, wherein the upper pan fixed thermostat is preset to a first selected temperature, and the lower pan fixed thermostat is preset to a second selected temperature.

4. The roaster according to claim 3, wherein the first selected temperature is different than the second selected temperature.

5. The roaster according to claim 1, further comprising a grease drain opening through the lower pan.

6. The roaster according to claim 1, further comprising temperature control circuitry operably coupled to the upper pan heating element and the lower pan heating element.

7. The roaster according to claim 1, further comprising timer control circuitry operably coupled to the upper pan heating element and the lower pan heating element.

8. The roaster according to claim 7, further comprising a time display operably coupled to the timer control circuitry.

9. The roaster according to claim 7, further comprising a time control operator interface.

10. The roaster according to claim 9, wherein the time control operator interface includes user input to adjust the time.

11. The roaster according to claim 7, wherein the timer control circuitry comprises a power line frequency timer.

12. The roaster according to claim 1, wherein the lower pan is hingedly connected to the upper pan.

* * * * *